United States Patent
Arndt et al.

(10) Patent No.: US 6,527,537 B2
(45) Date of Patent: Mar. 4, 2003

(54) TABLET ROTARY COMPRESSING PRESS FOR THE MANUFACTURE OF MULTI-LAYERED TABLETS

(75) Inventors: Ulrich Arndt, Lauenburg (DE); Thomas Heinrich, Stelle (DE); Jürgen Hinzpeter, Schwarzenbek (DE); Thomas Jacob, Geesthacht (DE); Peter Lüneburg, Berkenthin (DE); Gert Stellmach, Dresden (DE); Ulrich Zeuschner, Schwarzenbek (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 104 days.

(21) Appl. No.: 09/852,823

(22) Filed: May 10, 2001

(65) Prior Publication Data
US 2001/0046527 A1 Nov. 29, 2001

(30) Foreign Application Priority Data
May 17, 2000 (DE) .......................... 100 26 731

(51) Int. Cl.⁷ .............................................. B29C 43/34
(52) U.S. Cl. ...................... 425/341; 425/134; 425/345; 425/400
(58) Field of Search ................................ 425/134, 193, 425/341, 344, 345, 352, 353, 354, 355, 400, 418, 441, 443

(56) References Cited

U.S. PATENT DOCUMENTS 3,332,367 A * 7/1967 Sperry et al. ............. 264/37.29
5,071,336 A * 12/1991 Hinzpeter et al. .......... 425/135
5,843,488 A * 12/1998 Korsch et al. .............. 425/193

FOREIGN PATENT DOCUMENTS

| DE | 28 16141 | 7/1988 |
|---|---|---|
| DE | 40 25 484 | 10/1991 |
| EP | 0 349 777 | 6/1989 |

* cited by examiner

Primary Examiner—Jan H. Silbaugh
Assistant Examiner—Emmanuel S. Luk
(74) Attorney, Agent, or Firm—Vidas, Arrett & Steinkraus

(57) ABSTRACT

A tablet rotary compression press for the manufacture of multi-layered tablets, comprising a rotationally driven rotor which has a die-plate with die-plate bores and top and bottom rams aligned towards the die-plate bores which are guided in ram guides of the rotor and are axially actuated by stationary control cams, an insertion device for a portion of the tablet-forming compacts which has two or more arms guided in a radially movable manner at the each end of which a compact is held and can be aligned towards a die-plate bore, wherein said rotor has circumferentially included thereon a support ring or support surfaces on which the compacts can be deposited in the positions approximately aligned towards the die-plate bores, the radial arms are disposed in the rotor, rotate therewith, and have radially movable gripping portions adapted to be radially moved to each other, and the rotor has provided therein a stationary guide with first and second guide cams the cam followers of which are interacted with by the gripping portions in order to grip a compact on the support ring or a support surface, to bring it into alignment with the die-plate bore, and to release it again.

6 Claims, 4 Drawing Sheets

TABLET ROTARY COMPRESSING PRESS FOR THE MANUFACTURE OF MULTI-LAYERED TABLETS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a tablet rotary compression press for the manufacture of multi-layered tablets.

Rotary compression presses for the manufacture of tablet-shaped compacts are known in most varied embodiments. The typical rotary compression press comprises a rotationally driven rotor including a die-plate and top and bottom ram guides for the top and bottom rams, which interact with die-plate bores of the die-plate. The rams are actuated by stationary control cams. The compression process proper is performed by means of upper and lower pressure rollers by which the rams are moved against each other for the purpose of compressing the tablet from a powdered material which was introduced into the die-plate bores before.

It is also known to manufacture multi-layered tablets by means of such presses. If these consist of two or more layers it is readily possible to effect a layer-by-layer compression by means of appropriate charging devices and compression stations. In some cases, however, tablets are formed which are joined to a previously compressed portion, a so-called core. The core may either be pressed into a single-layered or multi-layered tablet on one side or may also be encased. For this case, it is required for the pre-compressed core to be fed from outside and to be aligned towards the die-plate bore in order that it may be compressed together with the material already pre-compressed in the die-plate bore. EP 0 349 777 A1 has made known a device by which pre-compressed cores are inserted. The known device has a rotationally driven disk next to the rotor. The disk supports therein radially movable arms each of which is adapted to hold a core with the aid of vacuum devices. The arms are radially moved while the disk is rotating in correspondence to the rotor such that the arms are brought into coincidence with a die-plate bore each. The expenditure for a device of this type and also the space it requires are relatively large.

It is the object of the invention to provide a tablet rotary compression press in which the insertion device for the pre-formed compacts may be integrated in the rotary compression press.

BRIEF SUMMARY OF THE INVENTION

In the inventive device, the rotor has circumferentially included thereon a ring-shaped support surface on which the compacts are deposited in a position approximately aligned towards the die-plate bores. The compacts can be separated from each other by means of an appropriate feeding device and can be fed by cycles in such a way that each of them, while being aligned towards the die-plate bores, comes to rest on the support surface. The latter may be provided with a suitable recess in which the compacts are retained and are prevented from slipping off or rolling off as a result of the centrifugal force. The inventive device also provides radial arms which, however, rotate with the rotor. The arms have two radially movable gripping portions which are adapted to be moved relative to each other. The gripping portions may be radially led to opposed sides of a compact resting on the support segment and may be moved together subsequently in order to grip the compact. Subsequently, the two gripping portions may radially be moved through a distance until the compact is above the die-plate bore. Then, the compact may be held in this position while the gripping portions will move apart again. Subsequently, the compact can be pressed by means of the top ram into the material which is in the die-plate bore already. The rotor has provided therein a stationary guide which has a first and a second guide cam the cam followers of which are interacted with by the gripping portions in order to grip a compact on the support segment, to bring it into alignment with the die-plate bore, and to release it again.

In the inventive rotary compression press, the insertion device for the compact or the cores is integrated in the rotor of the press. The arms and the guide of the arms form part of the rotor and are supported within the rotor. Therefore, the physical size of conventional rotary compression presses need not be exceeded.

Various possible ways are imaginable to grip the compact on the support segment by means of the gripping portions and carry it to the die-plate bore subsequently. A provision which is particularly easy, according to the invention, consists in that lifting means are associated with the support segment which lift the deposited compacts if they are between the gripping portions. In another aspect of the invention, the lifting means may have lifting pins which are actuated by a stationary control cam.

In another aspect of the invention, the stationary guide has a stationary disk in the rotor above the die-plate, which has guide grooves for the cam followers.

The gripping portions and their support, in turn, may be realized by designs of different types. According to the invention, one consists in that the gripping portions and the cam followers each are mounted on tube lengths which telescopically interact with radial bars which are fixed to the rotor in a radial direction.

In another aspect of the invention, it may be expedient that the arms be pivotally supported about a horizontal axis at the radial inner end and that another stationary guide be provided which lifts said arms via a predetermined angle of rotation of the rotor. The charging device is known to be stationary. It possibly obstructs the way of the arms which follow on. In order to overcome this obstacle, the arms may be pivoted up in the region of the charging device.

BRIEF DESCRIPTION OF THE DRAWINGS

The invention will now be explained in greater detail with reference to embodiments shown in the drawings.

FIG. 5 shows an illustration similar to FIGS. 2 and 4 with the compact being pressed in.

DETAILED DESCRIPTION OF THE INVENTION

Figure 1:
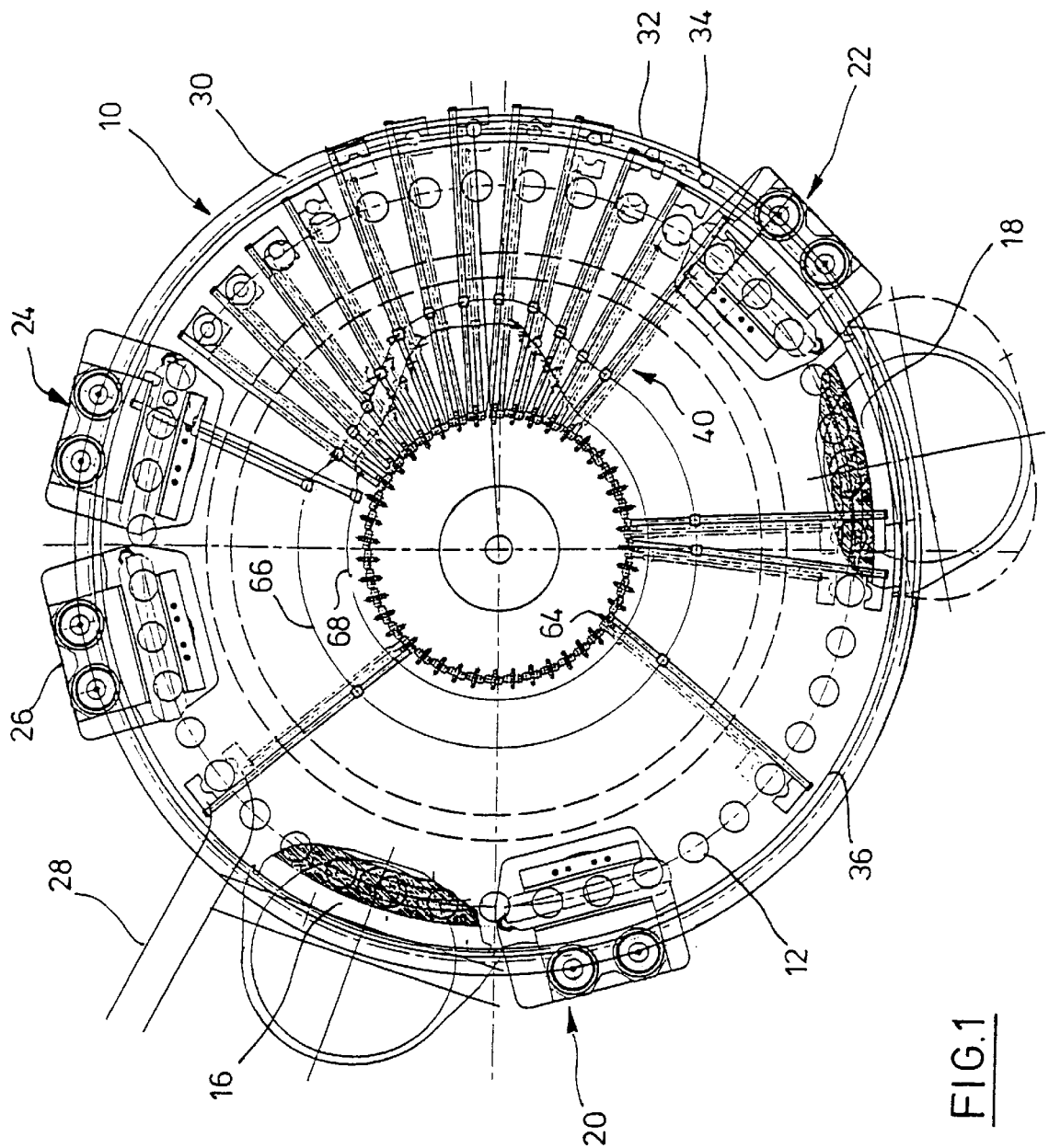
FIG. 1 schematically shows a plan view of the rotor of an inventive rotary compression press.

While this invention may be embodied in many different forms, there are described in detail herein a specific preferred embodiment of the invention. This description is an exemplification of the principles of the invention and is not intended to limit the invention to the particular embodiment illustrated Referring to FIG. 1, the rotor of a rotary compression press is shown at 10 with the top rams and the ram guide pertaining thereto omitted, however. What can be seen are the die-plate bores 12 on a graduated circle of the die-plate of the rotor 10. Associated with the rotor 10 are a first charging device 16 and a second charging device 18. They are stationary and serve for filling powdered material into the die-plate bores 12 with the bottom rams (not shown) locking the die-plate bores towards the bottom. After the charging device 16, a compression station 20 can be seen which leads the top and bottom rams together by means of pressure rollers in order to jointly compress the material which was filled in. Subsequent to the charging device 18, another compression station 22 is provided. Two more compression stations 24 and 26 are on the rotor 10 at a major circumferential spacing. The rotor will rotate in a counter-clockwise sense during the compression process. Thus, the measures just described, which are known as such, allow to compress a two-layered tablet which is removed at 28.

In the illustration of FIG. 1, a support ring 30 can be seen which is confined at the outside by a stationary ring segment 32 which extends nearly from the 6-o'clock position nearly to the 2-o'clock position. Thus, an ring portion channel is defined in this region into which circular compacts 34 or cores may be inserted. To secure the cores 34 in their positions, a restriction ring 36 may be provided at the inside of the support ring 30 which is equipped with small recesses by which the compacts 34 are located in the circumferential direction. The compacts 34 are deposited in an approximately radial alignment towards the die-plate bores.

Figure 3:
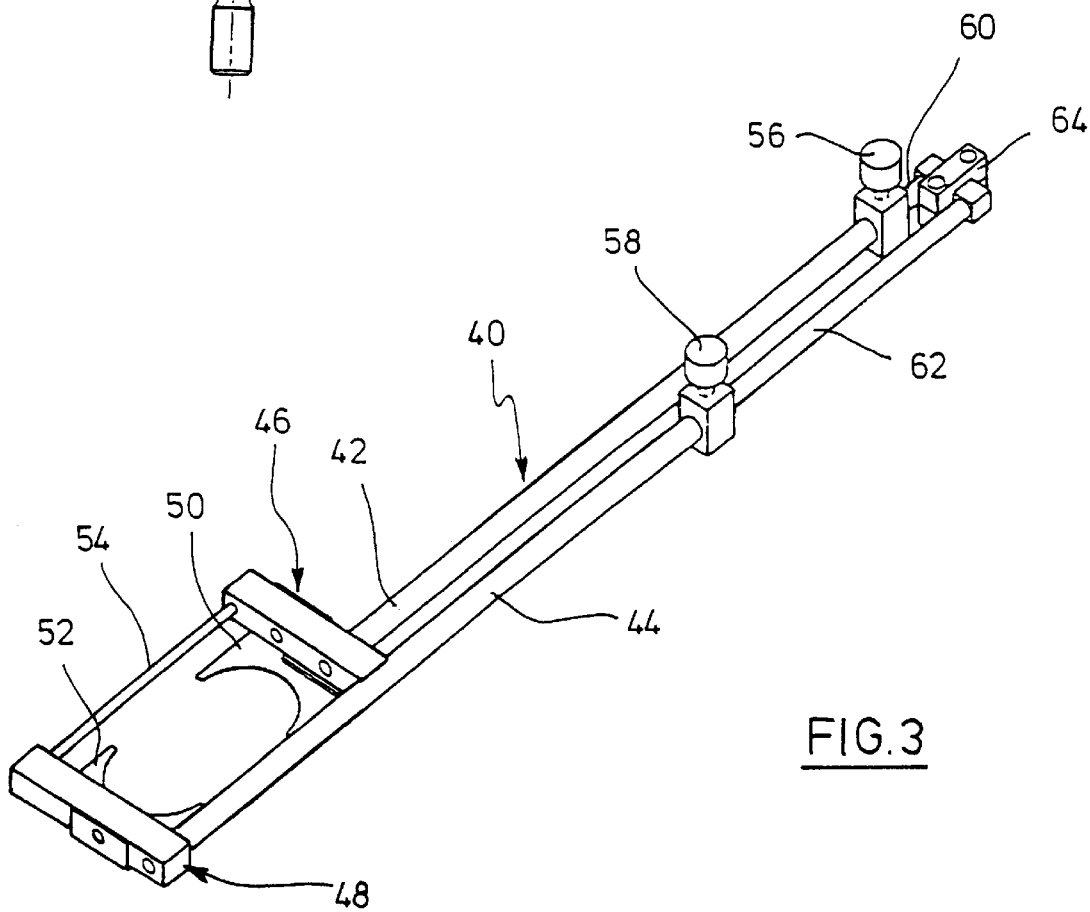
FIG. 3 shows a perspective view of the arm of FIG. 2.

Each die-plate bore 12 has associated therewith a radial arm 40 the structure of which can be seen in greater detail in FIG. 3. Each arm 40 has two parallel tube lengths 42, 44 which hold gripping portions 46, 48 at the ends. The gripping portions 46, 48 have gripping projections 50, 52 which can be exchanged in order to adapt them to the outer contour of the compact 34. The gripping portion 48 mounts a guide bar 54 which engages a guide bore of the gripping portion 46. Cam followers 56, 58 are mounted at the ends of the pipe lengths 42, 44. The pipe lengths 42, 44 telescopically interact with bars 60, 62 which are pivotally hinged about a horizontal axis on a block 64. The blocks 64 are firmly mounted on the rotor 10 as can be seen in FIG. 1. A disk (not shown) is stationarily disposed above the die-plate with the die-plate bores 12. It is held from above by the interior of the rotor which is floatingly supported. A floating support of rotors in rotary compression presses is known as such. The stationary disk has two ring-shaped grooves which are outlined at 66 and 68 in FIG. 1. The cam followers 56, 58 interact with the ring-shaped grooves 66, 68.

Figure 2:
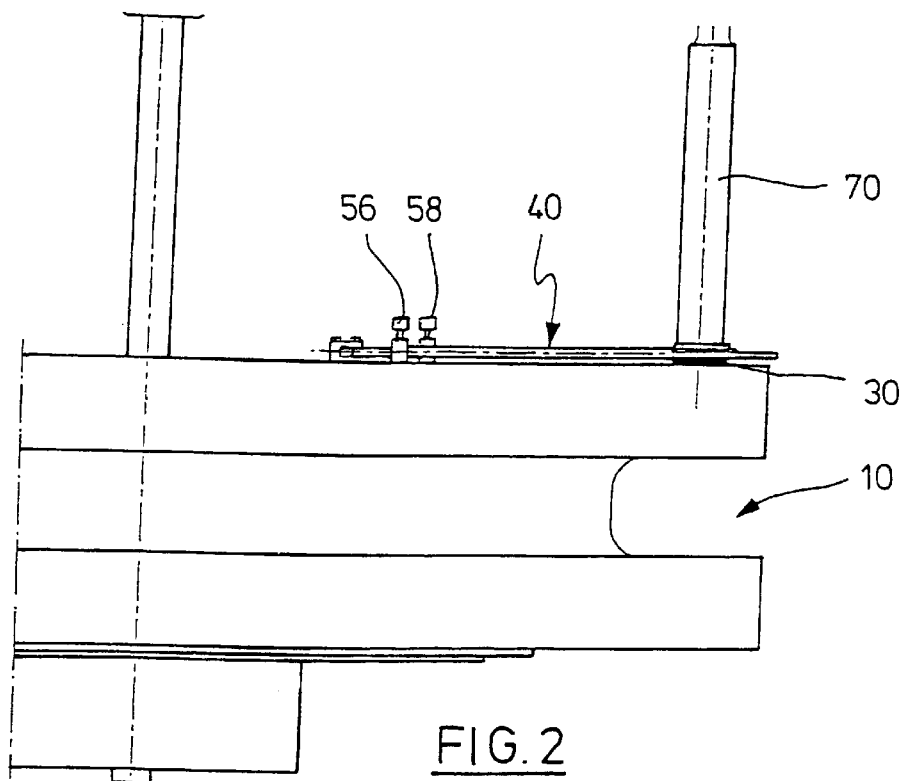
FIG. 2 shows a portion of the rotor of FIG. 1 with an arm and a top ram in a side view.
Figure 4:
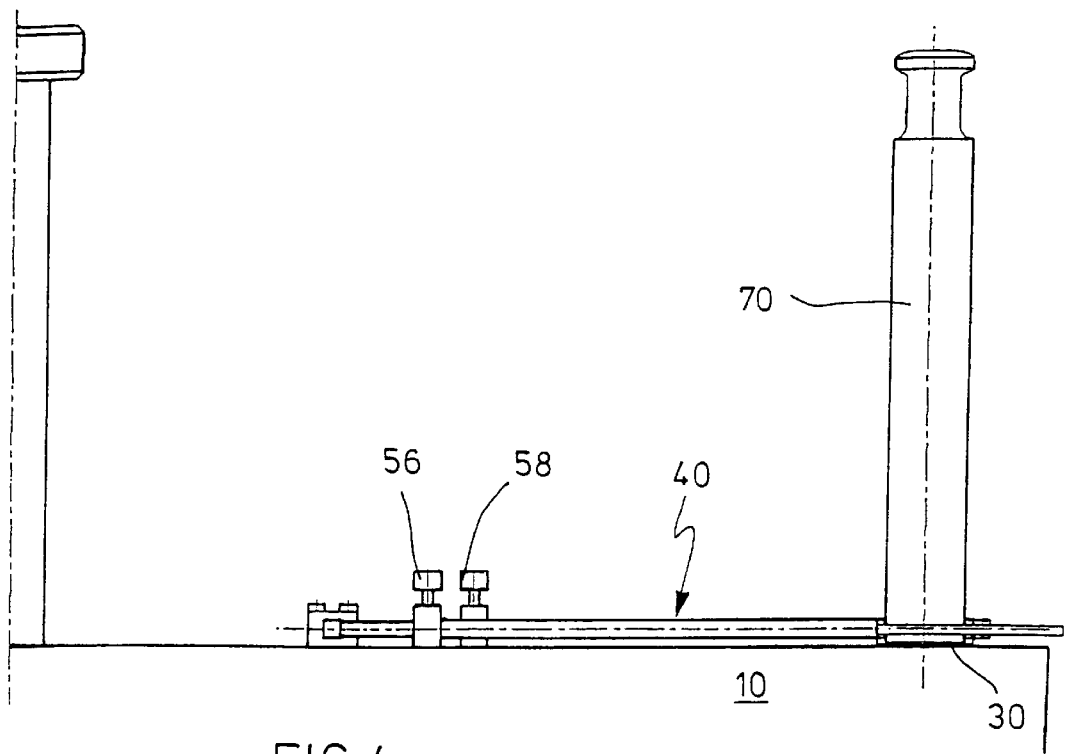
FIG. 4 shows an illustration similar to FIG. 2 with the top ram lowered to fix the compact.
Figure 5:
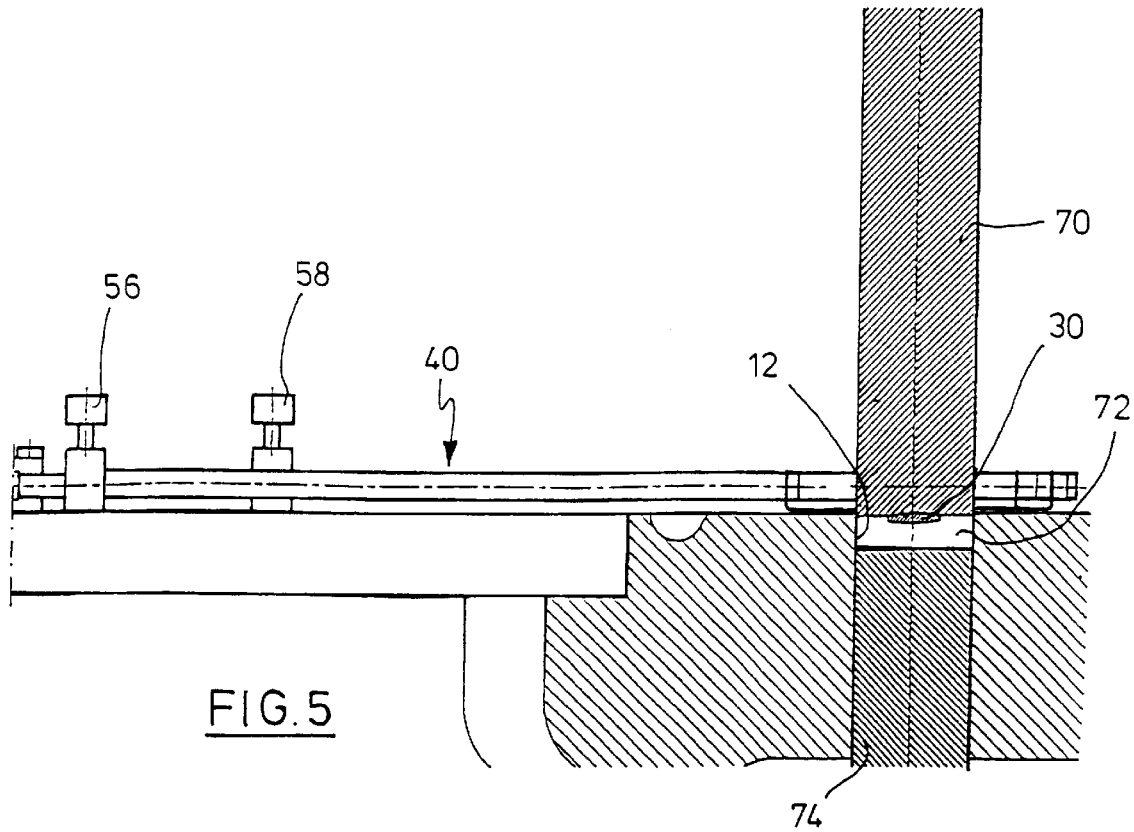
Figure 6:
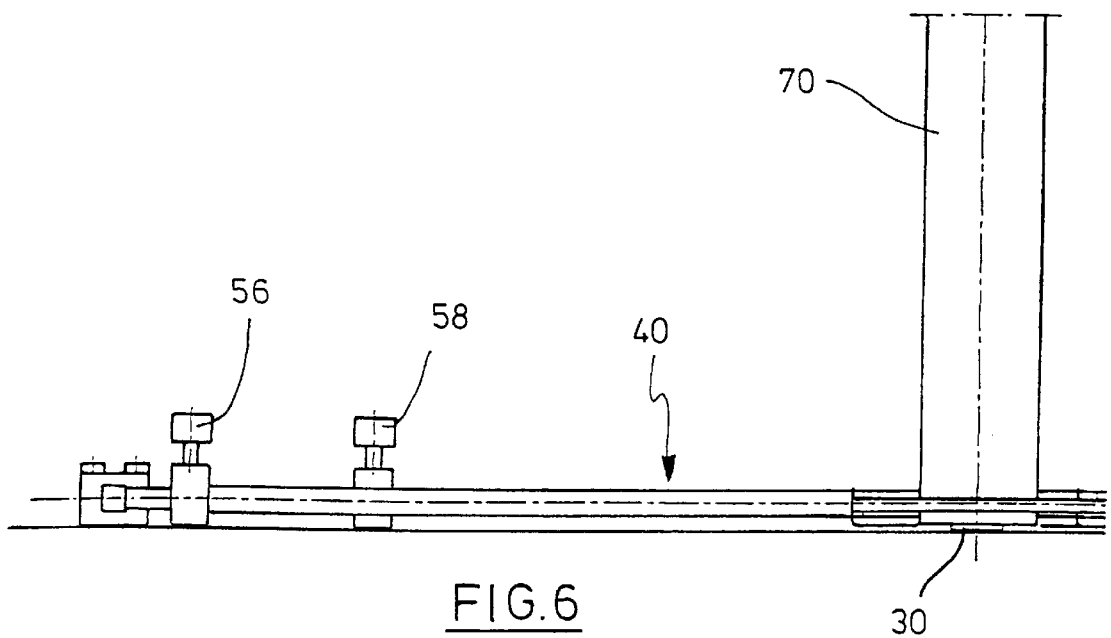
FIG. 6 shows the completion of the compact press-in operation.

What further can be seen from FIG. 1 is that the gripping portions 46, 48 radially are in an opened position on opposed sides of the die-plate bores from the compression station 24 up to the compression station 22 as seen in a counter-clockwise sense. After the compacts 34 are inserted downstream of the compression station 22 a radially outward displacement of the gripping portions 46, 48 begins because of the change in the run of the grooves 66, 68 until the portions lie on opposed sides of the compact. This is the case shortly after the 3-o'clock position in FIG. 1. A lifting device (not shown) in the form of pins below the positions of the compacts 34, which interact with a stationary control cam, lifts the compact 34 somewhat in between the projections 50, 52 of the gripping portions 46, 48. At the same time, the gripping portions are moved towards each other in order to grip the compact. When this has been done as can be seen in the 2-o'clock position in FIG. 1 the gripping portions 46, 48 subsequently will move radially inwards together until the core is aligned with the die-plate bore. This can be seen in the 1-o'clock position of FIG. 1. At the same time, the top ram which faces the die-plate bore is lowered. This can be seen in FIG. 2. The top ram is indicated by 70. What can be seen in FIG. 4 is that the top ram 70 has been lowered even more and now retains the compact 30. The gripping portions 46, 48 may now be moved apart by means of the control grooves 66, 68 and the top ram 70 presses the compact 30 into the compressed tablet portion 72 in the die-plate bore 12 and against the bottom ram 74. This operation is effected in the compression stations 24, 26. Subsequently, more powdered material may be filled in by means of the second charging device 16 so that a second layer is formed above the compact 30.

Figure 7:
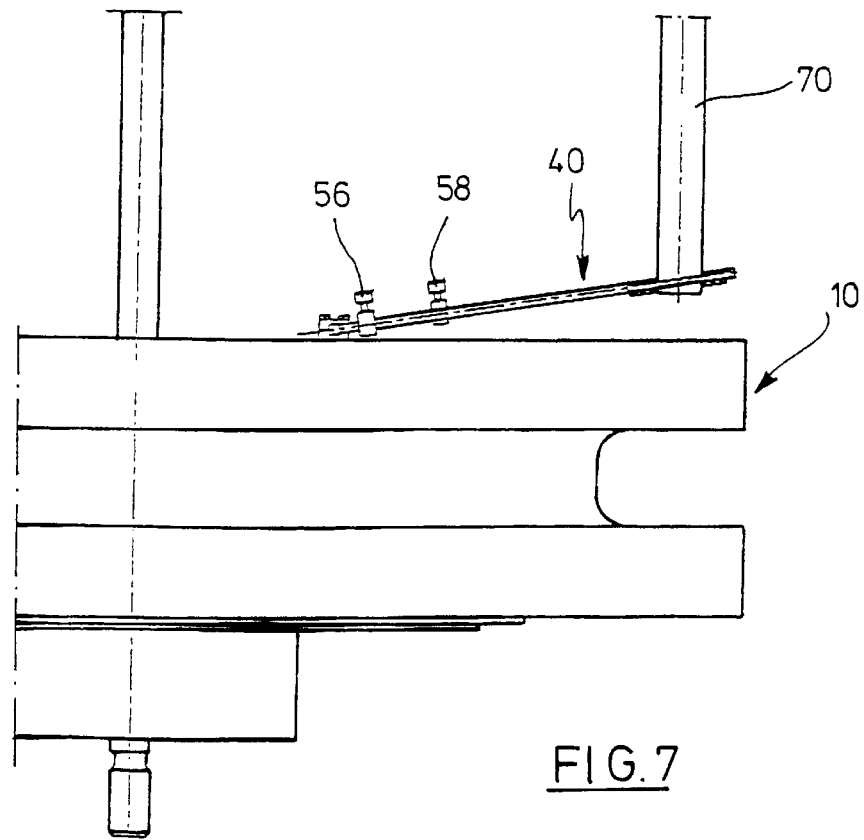
FIG. 7 shows an illustration similar to the preceding Figures, but with the radial arm pivoted up.

In FIG. 7, it can be seen that the arms 40 also can be pivoted upwards with a view to evading the charging devices or charging shoes 16, 18, for example. The gripping portions have been moved apart, as can also be seen in FIG. 1, so that the top ram 70 can be guided through the spacing between the gripping portions 46, 48.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A tablet rotary compression press for the manufacture of multi-layered tablets, comprising a rotationally driven rotor which has a die-plate with die-plate bores and top and bottom rams aligned towards the die-plate bores which are guided in ram guides of the rotor and are axially actuated by stationary control cams, an insertion device for a portion of the tablet-forming compacts which has two or more arms guided in a radially movable manner at the each end of which a compact is held and can be aligned towards a die-plate bore, characterized in that said rotor has circumferentially included thereon a support ring or support surfaces on which the compacts can be deposited in the positions approximately aligned towards the die-plate bores, the radial arms are disposed in the rotor, rotate therewith, and have radially movable gripping portions adapted to be radially moved to each other, and the rotor has provided therein a stationary guide with first and second guide cams the cam followers of which are interacted with by the gripping portions in order to grip a compact on the support ring or a support surface, to bring it into alignment with the die-plate bore, and to release it again.

2. The tablet press according to claim 1, characterized in that the support ring has associated therewith lifting means which lift the deposited compacts if they are between the gripping portions of an arm.

3. The tablet press according to claim 2, characterized in that lifting pins are provided which are actuated by a stationary control cam.

4. The tablet press according to claim 1, characterized in that the stationary guide has a stationary disk in the rotor above the die-plate, with guide grooves for the cam followers.

5. The tablet press according to claim 1, characterized in that the gripping portions and the cam followers each are mounted on tube lengths which telescopically interact with radial bars which are fixed to the rotor in a radial direction.

6. The tablet press according to claim 1, characterized in that the arms are pivotally supported about a horizontal axis at the radial inner end and that another stationary guide is provided which lifts said arms via a predetermined angle of rotation of the rotor.

\* \* \* \* \*